United States Patent
Abdoli et al.

(10) Patent No.: US 10,701,685 B2
(45) Date of Patent: Jun. 30, 2020

(54) METHOD AND APPARATUS FOR ASYNCHRONOUS OFDMA/SC-FDMA

(71) Applicant: Huawei Technologies Co., Ltd., Shenzhen (CN)

(72) Inventors: Javad Abdoli, Kanata (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 14/836,538

(22) Filed: Aug. 26, 2015

(65) Prior Publication Data

US 2016/0192353 A1    Jun. 30, 2016

Related U.S. Application Data

(63) Continuation-in-part of application No. 14/231,217, filed on Mar. 31, 2014, now Pat. No. 9,419,770.

(51) Int. Cl.
   *H04W 72/04* (2009.01)
   *H04L 27/26* (2006.01)
   *H04L 5/00* (2006.01)

(52) U.S. Cl.
   CPC ....... *H04W 72/0446* (2013.01); *H04L 5/0007* (2013.01); *H04L 5/0066* (2013.01);
   (Continued)

(58) Field of Classification Search
   CPC .............. H04L 27/2636; H04L 27/264; H04L 27/2647; H04L 27/265; H04L 5/0007;
   (Continued)

(56) References Cited

U.S. PATENT DOCUMENTS 4,244,047 A    1/1981 Perkins
4,863,613 A    9/1989 Johnson et al.
(Continued)

FOREIGN PATENT DOCUMENTS

CN    101034921 A    9/2007
CN    101405962 A    4/2009
(Continued)

OTHER PUBLICATIONS

Nikopour, H. et al., "Sparse Code Multiple Access," 2013 IEEE 24th International Symposium on Personal, Indoor and Mobile Radio Communications: Fundamentals and PHY Track, Sep. 8-11, 2013, pp. 332-336, London.
(Continued)

*Primary Examiner* — Parth Patel
*Assistant Examiner* — Berhanu D Belete
(74) *Attorney, Agent, or Firm* — Slater Matsil, LLP

(57) ABSTRACT

Cyclic prefix based OFDM (CP-OFDM) signals can be filtered using a digital filter whose filter length exceeds the length of a cyclic prefix in CP-OFDM symbols of the signal. In one example, the duration of the filtered CP-OFDM symbol may be expressed by the following equation: M=N+L−1, where M is the duration of the filtered CP-OFDM signal, N is a duration of the CP-OFDM signal, and L is the filter length of the digital filter. Digitally filtering the CP-OFDM signal may include convolving a filtering signal with the CP-OFDM signal. The digital filter may include a finite impulse response (FIR) filter or an infinite impulse response (IIR) filter. In some embodiments, a different digital filter may be applied to each sub-band of the CP-OFDM signal.

23 Claims, 14 Drawing Sheets

(52) U.S. Cl.
CPC .......... *H04L 27/264* (2013.01); *H04L 27/265* (2013.01); *H04L 27/2636* (2013.01); *H04L 27/2647* (2013.01)

(58) Field of Classification Search
CPC ... H04L 5/0066; H04L 5/0094; H04L 5/0006; H04W 72/0446
USPC ........................................................ 370/336
See application file for complete search history.

(56) References Cited

U.S. PATENT DOCUMENTS

| | | | |
|---|---|---|---|
| 6,324,234 B1 | 11/2001 | Kiasaleh | |
| 6,434,133 B1 | 8/2002 | Hämäläinen | |
| 6,628,735 B1* | 9/2003 | Belotserkovsky | H04L 27/2662 370/203 |
| 7,133,809 B1* | 11/2006 | Purkovic | H04L 25/0216 703/2 |
| 7,657,429 B2 | 2/2010 | Tsushima | |
| 7,859,988 B2* | 12/2010 | Yang | H04L 5/0007 370/208 |
| 8,130,715 B2* | 3/2012 | Kishiyama | H04J 13/0062 370/329 |
| 8,219,873 B1 | 7/2012 | Ng et al. | |
| 8,245,092 B2 | 8/2012 | Kotecha et al. | |
| 8,335,484 B1* | 12/2012 | Arad | H04B 1/0003 455/343.2 |
| 8,451,918 B1* | 5/2013 | Cheng | H04K 3/228 370/208 |
| 8,582,429 B2* | 11/2013 | Wang | H04W 72/042 370/230 |
| 8,582,676 B1* | 11/2013 | Zhang | H04L 27/2657 375/260 |
| 8,705,574 B2 | 4/2014 | Hammarwall et al. | |
| 8,719,654 B2 | 5/2014 | Kotecha et al. | |
| 8,737,509 B2 | 5/2014 | Yu et al. | |
| 8,743,981 B2* | 6/2014 | Zhang | H04L 27/2636 375/260 |
| 9,055,484 B2 | 6/2015 | Feng et al. | |
| 9,258,150 B2* | 2/2016 | Peroulas | H04L 27/2647 |
| 9,692,629 B2* | 6/2017 | Yang | H04L 5/0066 |
| 9,705,726 B2* | 7/2017 | Dandach | H04L 27/2631 |
| 2002/0059351 A1* | 5/2002 | Shiraishi | H03H 17/0219 708/306 |
| 2002/0105901 A1 | 8/2002 | Chini et al. | |
| 2004/0102222 A1 | 5/2004 | Skafidas et al. | |
| 2004/0218689 A1 | 11/2004 | Akhtman | |
| 2005/0018837 A1 | 1/2005 | Duvaut et al. | |
| 2005/0053121 A1 | 3/2005 | Lakkis | |
| 2005/0111462 A1 | 5/2005 | Walton et al. | |
| 2005/0152475 A1 | 7/2005 | Lakkis | |
| 2005/0157801 A1* | 7/2005 | Gore | H04L 25/0202 375/260 |
| 2005/0201326 A1 | 9/2005 | Lakkis | |
| 2005/0201473 A1 | 9/2005 | Lakkis | |
| 2006/0077885 A1 | 4/2006 | Schnell et al. | |
| 2006/0087961 A1* | 4/2006 | Chang | H04L 27/2607 370/203 |
| 2006/0159006 A1 | 7/2006 | Yeon et al. | |
| 2006/0160498 A1 | 7/2006 | Sudo | |
| 2006/0215778 A1* | 9/2006 | Murthy | H04L 27/2662 375/260 |
| 2006/0291578 A1* | 12/2006 | Singh | H04L 5/0048 375/260 |
| 2007/0140106 A1* | 6/2007 | Tsai | H04L 5/0053 370/208 |
| 2007/0211786 A1* | 9/2007 | Shattil | H04J 13/00 375/141 |
| 2007/0218942 A1 | 9/2007 | Khan et al. | |
| 2008/0037686 A1* | 2/2008 | Akita | H04L 5/0048 375/302 |
| 2008/0051090 A1 | 2/2008 | Kobayashi | |
| 2008/0137525 A1* | 6/2008 | Liu | H04L 25/0232 370/203 |
| 2008/0225783 A1 | 9/2008 | Wang et al. | |
| 2009/0110033 A1* | 4/2009 | Shattil | H04J 14/0298 375/141 |
| 2009/0124261 A1 | 5/2009 | Shimomura | |
| 2009/0161793 A1 | 6/2009 | Nentwig | |
| 2009/0196379 A1 | 8/2009 | Gan et al. | |
| 2009/0219977 A1 | 9/2009 | Iwamatsu | |
| 2009/0279626 A1* | 11/2009 | Wang | H04L 27/2605 375/260 |
| 2009/0285122 A1 | 11/2009 | Onggosanusi et al. | |
| 2010/0027707 A1 | 2/2010 | Takahashi et al. | |
| 2010/0040043 A1* | 2/2010 | Li | H04L 27/2695 370/350 |
| 2010/0085934 A1 | 4/2010 | Wang et al. | |
| 2010/0093288 A1 | 4/2010 | Pan et al. | |
| 2010/0115358 A1 | 5/2010 | Kotecha et al. | |
| 2010/0189132 A1* | 7/2010 | Fettweis | H04L 5/003 370/480 |
| 2010/0220797 A1 | 9/2010 | Namba et al. | |
| 2010/0239040 A1 | 9/2010 | Beluri et al. | |
| 2010/0246558 A1 | 9/2010 | Harel | |
| 2011/0034198 A1 | 2/2011 | Chen et al. | |
| 2011/0044255 A1* | 2/2011 | Ikeda | H04L 27/2607 370/328 |
| 2011/0058471 A1 | 3/2011 | Zhang | |
| 2011/0087933 A1 | 4/2011 | Varnica et al. | |
| 2011/0110458 A1 | 5/2011 | Siohan et al. | |
| 2011/0158343 A1 | 6/2011 | Park et al. | |
| 2011/0164597 A1* | 7/2011 | Amini | H04L 27/2627 370/338 |
| 2011/0170625 A1 | 7/2011 | Blankenship et al. | |
| 2011/0176499 A1 | 7/2011 | Siomina et al. | |
| 2011/0177499 A1 | 7/2011 | Quake et al. | |
| 2011/0182332 A1* | 7/2011 | Ericson | H04L 5/0044 375/219 |
| 2011/0216781 A1 | 9/2011 | Barr | |
| 2011/0261894 A1 | 10/2011 | Yu et al. | |
| 2011/0274123 A1 | 11/2011 | Hammarwall et al. | |
| 2011/0293040 A1* | 12/2011 | Dupont | H04L 27/2684 375/316 |
| 2011/0310847 A1* | 12/2011 | Ma | H04B 7/022 370/331 |
| 2011/0319025 A1* | 12/2011 | Siomina | H04B 7/0617 455/63.1 |
| 2012/0076204 A1 | 3/2012 | Raveendran et al. | |
| 2012/0093176 A1* | 4/2012 | Siohan | H04L 5/0007 370/497 |
| 2012/0170630 A1* | 7/2012 | Peroulas | H04L 25/0212 375/224 |
| 2012/0183020 A1 | 7/2012 | Koike-Akino et al. | |
| 2012/0224554 A1 | 9/2012 | Park | |
| 2012/0250801 A1* | 10/2012 | Lee | H04L 25/022 375/340 |
| 2012/0294382 A1 | 11/2012 | Wang et al. | |
| 2012/0300711 A1 | 11/2012 | Wang et al. | |
| 2013/0010849 A1 | 1/2013 | Shimizu et al. | |
| 2013/0016966 A1* | 1/2013 | Jansen | H04L 27/2626 398/25 |
| 2013/0022090 A1* | 1/2013 | Weng | H04L 25/03343 375/219 |
| 2013/0036338 A1 | 2/2013 | Kotecha et al. | |
| 2013/0044661 A1 | 2/2013 | Jokimies et al. | |
| 2013/0094468 A1 | 4/2013 | Ko et al. | |
| 2013/0102254 A1* | 4/2013 | Cyzs | H04B 1/525 455/63.1 |
| 2013/0148971 A1* | 6/2013 | Yu | H04L 27/2613 398/79 |
| 2013/0182791 A1 | 7/2013 | Dhakal et al. | |
| 2013/0188578 A1* | 7/2013 | Touboul | H04W 72/04 370/329 |
| 2013/0188751 A1 | 7/2013 | Ohlmer et al. | |
| 2013/0286959 A1 | 10/2013 | Lou et al. | |
| 2014/0010272 A1* | 1/2014 | Ma | H04J 11/004 375/224 |
| 2014/0064147 A1 | 3/2014 | Wang et al. | |
| 2014/0140289 A1 | 5/2014 | Moulsley | |
| 2014/0162544 A1 | 6/2014 | Edge | |

(56) References Cited

U.S. PATENT DOCUMENTS

| | | |
|---|---|---|
| 2014/0226742 A1 | 8/2014 | Yu et al. |
| 2014/0245094 A1 | 8/2014 | Kotecha et al. |
| 2014/0254544 A1 | 9/2014 | Kar Kin Au et al. |
| 2014/0293968 A1* | 10/2014 | Ebrahimi Tazeh Mahalleh .......... H04W 56/001 370/336 |
| 2014/0301282 A1* | 10/2014 | Paiva ............... H04J 11/004 370/329 |
| 2014/0328439 A1* | 11/2014 | Walker ............. H04L 5/0007 375/348 |
| 2015/0003542 A1* | 1/2015 | Barbu ............. H04L 25/0218 375/260 |
| 2015/0023331 A1* | 1/2015 | You ................. H04L 5/0048 370/336 |
| 2015/0043568 A1 | 2/2015 | Coulon et al. |
| 2015/0131636 A1 | 5/2015 | Tanaka |
| 2015/0181481 A1 | 6/2015 | Masini et al. |
| 2015/0304146 A1* | 10/2015 | Yang ................ H04L 5/0066 370/329 |
| 2015/0304868 A1 | 10/2015 | Yu et al. |
| 2015/0358971 A1 | 12/2015 | Soriaga et al. |
| 2015/0372843 A1* | 12/2015 | Bala ............. H04L 25/03834 375/295 |
| 2016/0021565 A1* | 1/2016 | Kim ............... H04J 11/004 370/329 |
| 2016/0112992 A1 | 4/2016 | Bhushan et al. |
| 2017/0264476 A1* | 9/2017 | Yang ............... H04L 27/0008 |

FOREIGN PATENT DOCUMENTS

| | | | |
|---|---|---|---|
| CN | 101567714 A | 10/2009 | |
| CN | 101860386 A | 10/2010 | |
| CN | 101904103 A | 12/2010 | |
| CN | 102232319 A | 11/2011 | |
| CN | 102439866 A | 5/2012 | |
| CN | 103067095 A | 4/2013 | |
| CN | 103262453 A | 8/2013 | |
| EP | 2479910 A2 | 7/2012 | |
| EP | 2840749 A1 | 2/2018 | |
| JP | 2008054237 A | 3/2008 | |
| JP | 2009526500 A | 7/2009 | |
| JP | 2010517389 A | 5/2010 | |
| RU | 2378800 C2 | 1/2010 | |
| RU | 105491 U1 | 6/2011 | |
| WO | 2007092945 A2 | 8/2007 | |
| WO | 2007149961 A1 | 12/2007 | |
| WO | 2008007437 A1 | 1/2008 | |
| WO | 2009112748 A1 | 9/2009 | |
| WO | WO-2010050731 A2 * | 5/2010 | ......... H04L 27/2607 |
| WO | 2010102435 A1 | 9/2010 | |
| WO | 2012048218 A1 | 4/2012 | |
| WO | 2013062310 A1 | 5/2013 | |
| WO | 2014016944 A1 | 1/2014 | |

OTHER PUBLICATIONS

Al-Imari, et al., "Low Density Spreading for next generation multicarrier cellular systems," 2012 International Conference on Future Communication Networks (ICFCN), pp. 52-57, Apr. 2-5, 2012.

Beko, M., et al., "Designing Good Multi-Dimensional Constellations," IEEE Wireless Communications Letters, vol. 1, No. 3, Jun. 2012, pp. 221-224.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

Van De Beek, J., et al., "Multiple Access with Low-Density Signatures," Huawei Technologies Sweden, IEEE Globecom, 2009 proceedings, 6 pages.

Zhang, et al., "A Survey on 5G New Waveform: From Energy Efficiency Aspects," IEEE, Date of Conference Nov. 2-5, 2014, pp. 1939-1943.

International Search Report Received in PCT/CN2015/075434, dated Jul. 3, 2015, 11 pages.

Qiang, Jianfeng et al., "Filter Bank Based Multiuser Receiver for Wireless OFDMA Systems", IEEE International Symposium on Microwave, Antenna, Propagation and EMC Technologies for Wireless Communications Proceedings, 2005, vol. 2, Aug. 8, 2005, pp. 1123-1126.

Tonello, Andrea M., "Performance Analysis of a Multiple Antenna Concatenated DMT-FMT Scheme in the Uplink", Wireless Communication Systems, 2nd International Symposium, Siena, Italy, Sep. 5-9, 2005, pp. 591-595.

Al-Imari, Mohammed, et al., "Performance Evaluation of Low Density Spreading Multiple Access", 2012, 8th International Wireless Communications and Mobile Computing Conference (IWCMC), Aug. 2012, pp. 383-388.

Okuyama, T, et al., "A Study on Autonomous Node Synchronization Scheme Based on Periodicity in Cyclic Prefix for Non-Orthogonal Multiple Access," The Institute of Electronics, Information and Communication Engineers, IEICE Technical Report, RCS2013-203, Nov. 2013, 8 pages, vol. 113, No. 301.

Nikopour, H., et al., "Sparse Code Multiple Access", 2013 IEEE 24th International Symposium on Personal, Indoor and Mobile Radio Communications: Fundamentals and PHY Track, Aug. 2013, 5 Pages.

Tonello, A., "Performance Analysis of a Multiple Antenna Concatenated DMT-FMT Scheme in the Uplink", Proceedings of IEEE International Symposium on Wireless Communication Systems, Sep. 5-7, 2005, 5 Pages, Siena, Italy.

* cited by examiner

The spectrum of a band-pass signal

The spectrum of the signal after downsampling with the sampling rate 1/Ts

METHOD AND APPARATUS FOR ASYNCHRONOUS OFDMA/SC-FDMA This patent application is a continuation in part (CIP) of U.S. application Ser. No. 14/231,217, filed on Mar. 31, 2014 and entitled "Method and Apparatus for Asynchronous OFDMA/SC-FDMA," which is hereby incorporated by reference herein as if reproduced in its entirety.

TECHNICAL FIELD

The present disclosure is generally directed to asynchronous communication in a wireless communication system.

BACKGROUND

Orthogonal Frequency Division Multiple Access (OFDMA)/Single Carrier-Frequency Division Multiple Access (SC-FDMA) systems are prevalent today. Typically, in an OFDMA system, the signals of several different users (i.e., entities that wish to communicate over the communication system) will each be assigned one or more unique subcarriers. Each subcarrier is generated and transmitted in a manner that allows all of the subcarriers to be transmitted concurrently without interfering with one another. Therefore, independent information streams can be modulated onto each subcarrier whereby each such subcarrier can carry independent information from a transmitter to one or more receivers.

Conventional OFDMA/SC-FDMA systems use a rectangular pulse shape, i.e., sinc in frequency, which has high side lobes. As a result, there are stringent synchronization requirements to maintain orthogonality. Timing advance signaling is required for synchronous multiple access, causing overhead. This overhead increases with the number of transmitters, which is a consideration in applications such as machine-type communication where a plurality of machines communicate with a base station. Moreover, OFDMA/SC-FDMA is highly sensitive to carrier frequency offset (CFO) mismatch between different electronic devices.

One way to avoid the aforementioned issues is to use Orthogonal Frequency Division Multiplexing/Offset Quadrature Amplitude Modulation (OFDM/OQAM), which has become popular in the wireless community recently. However, using OFDM/OQAM has issues such as peak to average power ratio (PAPR), Multiple-Input Multiple-Output (MIMO) transmission, and time domain tails.

It would therefore be desirable to be able to provide a system that enjoys the benefits of OFDMA/SC-FDMA as its core waveform and yet offers the capability of asynchronous communication.

SUMMARY OF THE INVENTION

According to one embodiment, a method for communicating orthogonal frequency-division multiplexing (OFDM) signals in a wireless communication system is provided. In this example, the method comprises obtaining a cyclic prefix based OFDM (CP-OFDM) signal including a plurality of CP-OFDM symbols having a cyclic prefix comprising a repetition of an end of the corresponding CP-OFDM symbol. The method further includes applying a digital filter to the obtained CP-OFDM signal to obtain a filtered CP-OFDM signal, and transmitting the filtered CP-OFDM signal over a radio interface. An apparatus for performing this method is also provided.

In another embodiment, a method for receiving orthogonal frequency-division multiplexing (OFDM) signals in a wireless communication system is provided. In this example, the method includes receiving a cyclic prefix based OFDM (CP-OFDM) signal over a radio interface. The CP-OFDM signal includes a plurality of CP-OFDM symbols having a cyclic prefix having a repetition of an end of the corresponding CP-OFDM symbol. The method further includes applying a digital filter to the obtained CP-OFDM signal to obtain a filtered CP-OFDM signal, and processing the filtered CP-OFDM signal. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION OF ILLUSTRATIVE EMBODIMENTS

Aspects of this disclosure filter cyclic prefix based OFDM (CP-OFDM) signals using a digital filter whose filter length exceeds the length of a cyclic prefix in CP-OFDM symbols. In one example, the duration of the filtered CP-OFDM symbol may be expressed by the following equation: $M=N+L-1$, where M is the duration of the filtered CP-OFDM signal, N is a duration of the CP-OFDM signal, and L is the filter length of the digital filter. Digitally filtering the CP-OFDM signal may include convolving a filtering signal with the CP-OFDM signal. The digital filter may include a finite impulse response (FIR) filter or an infinite impulse response (IIR) filter. In some embodiments, a different digital filter may be applied to each sub-band of the CP-OFDM signal.

Each sub-band may be assigned to a group of one or more user equipments (UEs), and the specific digital filter applied to a specific sub-band of the CP-OFDM signal may be used by the corresponding UE during decoding. The bandwidth of the digital filter may be adjusted based on the bandwidth of the CP-OFDM signal.

Figure 1:
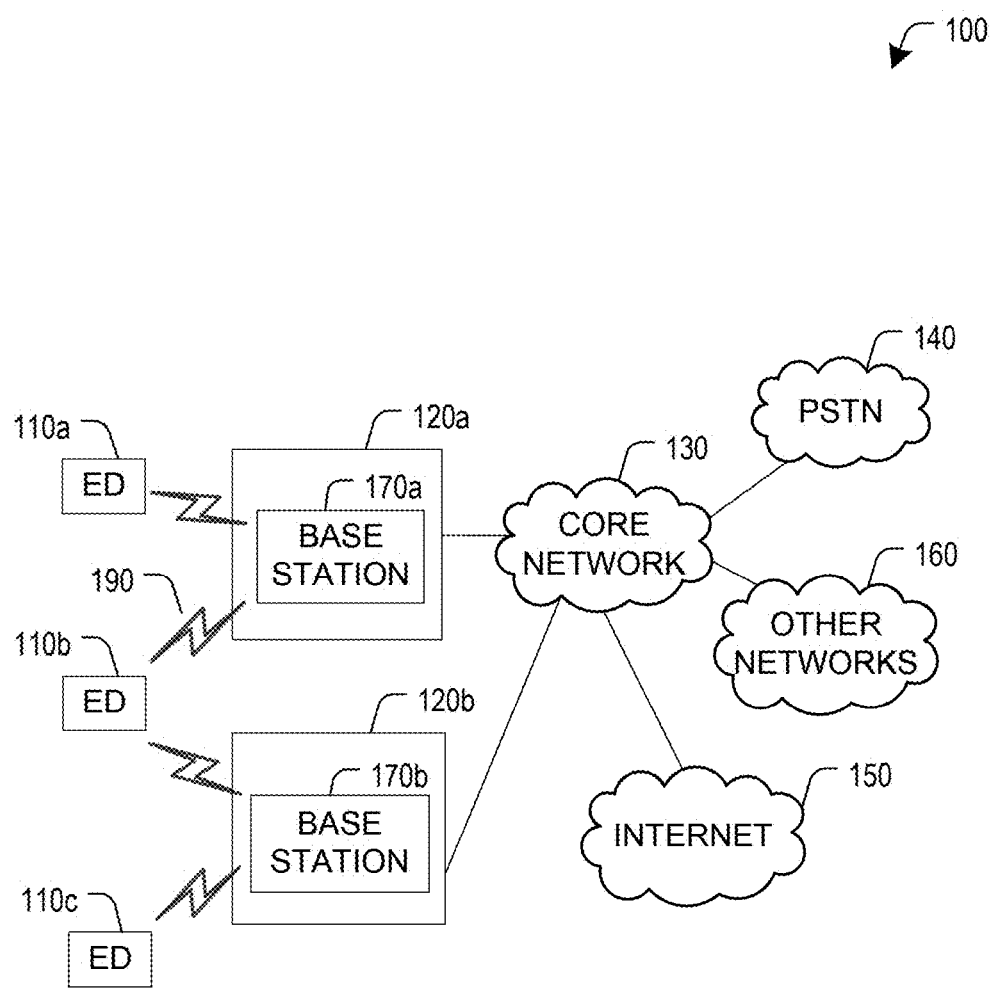
FIG. 1 illustrates an example communication system for asynchronous communication according to one embodiment.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
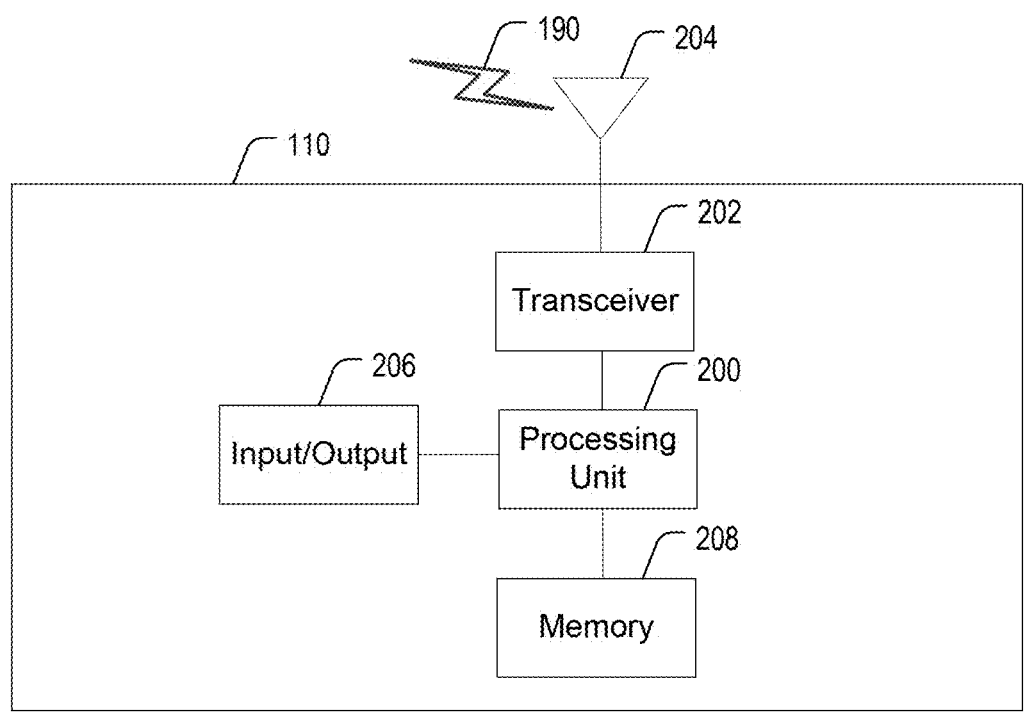
FIGS. 2A and 2B illustrate example devices that can implement asynchronous communication according to one embodiment.
Figure 2B:
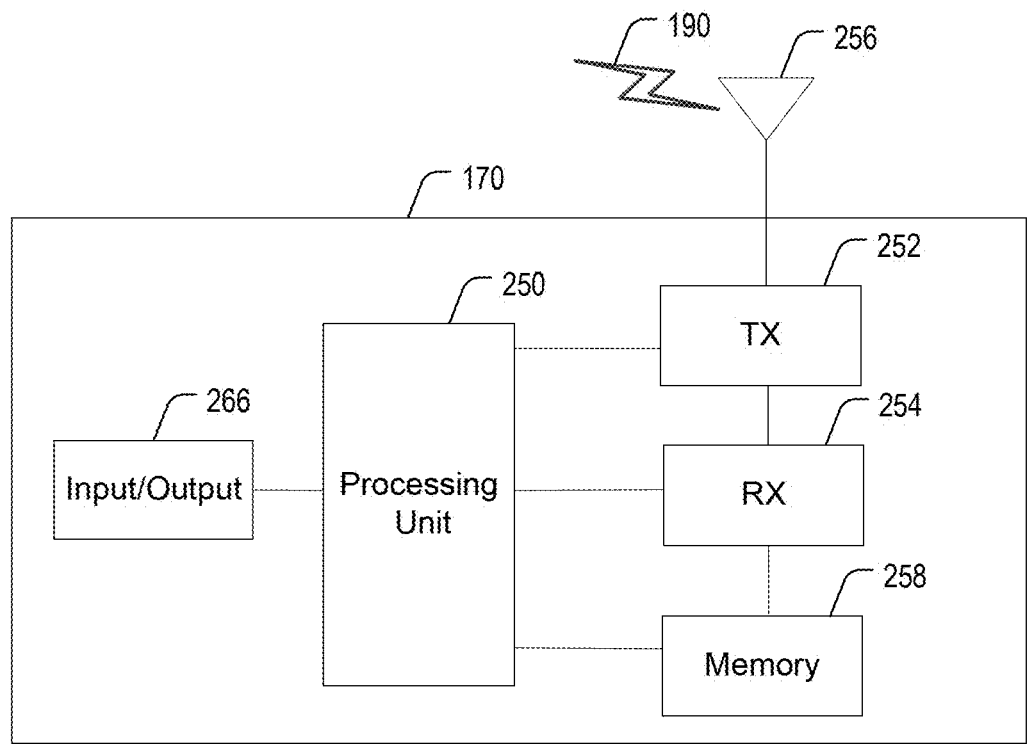

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Figure 3:
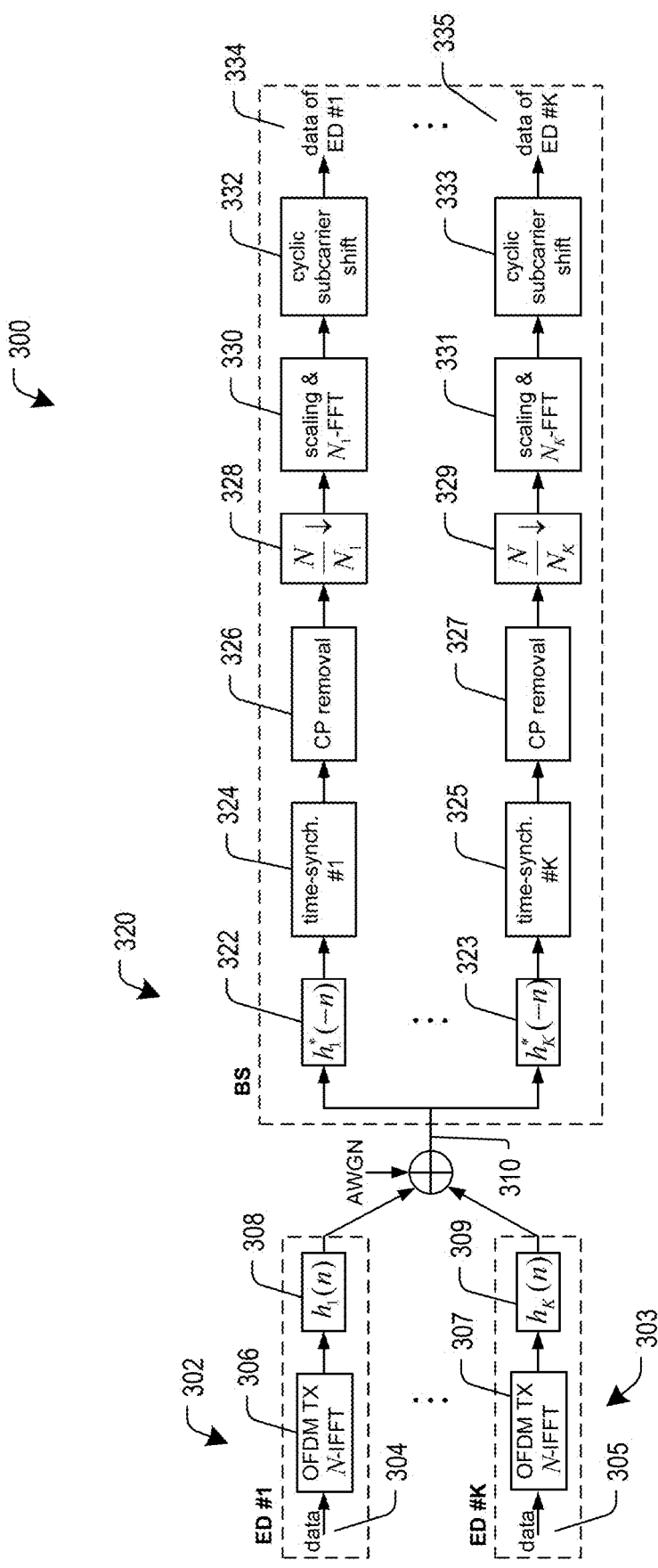
FIG. 3 illustrates an example of a topology or system for implementing asynchronous communication according to one embodiment.

FIG. 3 illustrates an example of a topology or system 300 for wireless transmission of data according to an embodiment of this disclosure. The system 300 comprises a plurality of electronic devices (EDs) 302 to 303 (e.g., ED #1 to ED #K) and at least one receiver 320. In some embodiments, each electronic device 302, 303 may comprise the electronic device 110 of FIG. 1 and the receiver 320 may comprise the base station 170 of FIG. 1. The techniques described herein may be used for an asynchronous system in which the receiver receives an asynchronous superposition of the signals of EDs. These techniques may also be used for a synchronous system in which the receiver receives a synchronous superposition of the signals of EDs.

Each ED 302, 303 comprises a respective OFDM modulator 306, 307 configured to receive respective data 304, 305 and a respective spectrum shaping filter 308, 309. The data 304, 305 may be a modulation data sequence, and the OFDM modulators 306, 307 include inverse fast Fourier transform (IFFT) blocks. The OFDM modulators 306, 307 may also include respective cyclic prefix (C P) generators (not shown).

During operation, each ED 302, 303 generates its modulated signal (which is the result of an IFFT operation on the modulation data sequence) corresponding to its assigned resource blocks. A resource block is a set of resource elements. Each resource element corresponds to a specific subcarrier in a specific OFDM symbol. For example, a resource block in LTE is defined as a set of 12×14=168 resource elements (e.g., 12 consecutive subcarriers in 14 consecutive OFDM symbols). The signal may be an OFDM signal, a DFTS-OFDM signal, or other signal. Thereafter, each ED 302, 303 passes its OFDM signal through its appropriately designed spectrum shaping filter 308, 309 in order to eliminate side lobe leakage to the adjacent electronic devices in frequency. One skilled in the art will appreciate that although reference is made to the elimination of a side lobe, the described methods and systems will also be applicable if the filter reduces or strongly attenuates the side lobes. Filtering makes the signal of each ED localized in frequency. The EDs are assigned to be beside each other in frequency so each signal after the filtering is localized to a certain level such that the amount of interference that EDs cause each other is negligible.

To illustrate, the spectrum shaping filter 308 is centered at the assigned resource blocks of ED #1, its bandwidth is equal to the total width of the resource blocks assigned to ED #1, and its time duration is equal to half of an OFDM symbol. Similarly, the spectrum shaping filter 309 is centered at the assigned resource blocks of ED #K, its bandwidth is equal to the total width of the resource blocks assigned to ED #K, and its time duration is equal to half of an OFDM symbol.

The spectrum shaping filters 308, 309 offer sharp side lobe leakage elimination so that the electronic devices 302, 303 do not cause interference to each other during asynchronous transmission. As an illustrative example, the spectrum shaping filter 308 may be a finite impulse response (FIR) filter or other suitable filter.

Each ED 302, 303 starts the transmission at any time—it does not need to be synchronized to other EDs. However, the receiver 320 needs to know when transmission occurs.

The modulated signals transmitted by each of the EDs 302, 303 pass through the communication channels and are received at the receiver 320 and combined, such that the receiver 320 receives a combined signal 310. As illustrated, the received signal 310 is passed through K chains of operations corresponding to the K EDs 302, 303. The output of each chain (e.g., 334, 335) is the demodulated sequence of the corresponding ED.

To illustrate, the receiver operation of the i'th chain includes filtering, where the received signal 310 is passed through a filter $h_i^*(-n)$, which is matched to the corresponding filter used at ED #i. The role of this matched filtering is twofold: firstly, it rejects the contributions of the other EDs from the signal 310. This ensures that the OFDM receiver (i.e., the subsequent FFT block in the chain), does not grab any interference from the neighboring EDs. Secondly, the matched filtering maximizes the received signal-to-noise ratio of ED #i.

For example, the receiver operation of the first chain includes filtering, where the received signal 310 is passed through a filter $h_1^*(-n)$ 322, which is matched to the filter 308 used at ED #1 302. Similarly, the receiver operation of the K'th chain includes filtering, where the received signal 310 is passed through a filter $h_K^*(-n)$ 323, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED. The appropriate time shift includes the delay of ED #i together with the aggregate delay of the end-to-end filter $g_i(n) \triangleq h_i(n)*h_i^*(-n)$, i.e., the delay of its strongest tap, which is typically its middle tap. The beginning and end tails of the signal, due to the end-to-end filter $g_i(n)$, are truncated.

To illustrate, the receiver operation of the first chain includes time synchronization that is performed at a time synchronization block 324. At the output of the filter 322, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)* h_1^*(-n)$. The delay compensated signal is then divided into OFDM symbols, and the cyclic prefix (CP) is removed from each received OFDM symbol by the cyclic prefix removal block 326. Similarly, the receiver operation of the K'th chain includes time synchronization that is performed at a time synchronization block 325. At the output of the filter 323, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)* h_K^*(-n)$. The delay compensated signal is then divided into OFDM symbols, and the cyclic prefix (CP) is removed from each received OFDM symbol by the cyclic prefix removal block 327.

The receiver operation of the i'th chain includes down sampling that is performed at a down sampling block. For example, each OFDM symbol is down sampled with a factor of $N/N_i$, where N is the fast Fourier transform (FFT) size of each ED's OFDM symbol and $N_i \triangleq 2^{\lceil log_2 M_i \rceil}$, with $M_i$ being the number of subcarriers assigned to the ED #i. Therefore, each resulting OFDM symbol has $N_i$ samples. The down sampling is done for the sake of receiver complexity reduction. The down sampling factor is chosen to satisfy Nyquist sampling criterion for reconstruction, with the constraint of $N_i$ being a power of 2 in order to enable the subsequent FFT.

For example, the receiver operation of the first chain includes down sampling that is performed at a down sampling block 328. Similarly, the receiver operation of the K'th chain includes down sampling that is performed at a down sampling block 329.

The receiver operation of the i'th chain includes scaling to account for the down sampling effect and the scaled signal is passed through an $N_i$-point FFT block (e.g., a "short" FFT) to transform each symbol to the frequency domain. For example, the receiver operation of the first chain includes scaling of the down sampled signal to account for the down sampling effect and the scaled signal is passed through an $N_1$-point FFT block 330. Similarly, the receiver operation of the K'th chain includes scaling of the down sampled signal to account for the down sampling effect and is passed through an $N_K$-point FFT block 331.

The receiver operation of the i'th chain includes a cyclic subcarrier shift that is performed at a cyclic subcarrier shift block to account for down sampling of the band-pass signals. For example, the receiver operation of the first chain includes a cyclic subcarrier shift that is performed at a cyclic subcarrier shift block 332. Similarly, the receiver operation of the K'th chain includes a cyclic subcarrier shift that is performed at a cyclic subcarrier shift block 333. The output of each chain (e.g., 334, 335) is the demodulated sequence of the corresponding ED.

Although FIG. 3 illustrates one example of a system 300 for wireless transmission of data according to an embodiment of this disclosure, various changes may be made to FIG. 3. For example, various components in FIG. 3 could be combined, further sub-divided, moved, or omitted and additional components could be added according to particular needs. Also, the system 300 could include any number of each component shown in FIG. 3.

Figure 4:
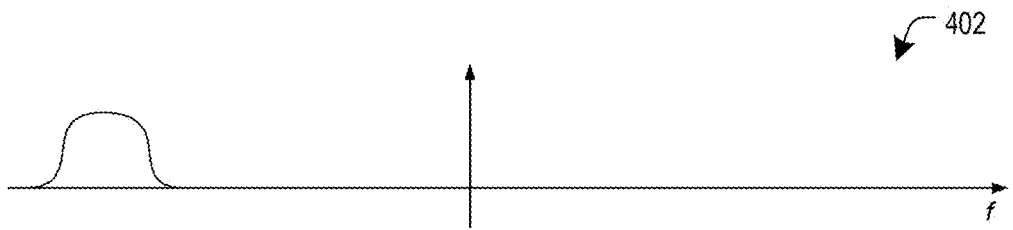
FIG. 4 illustrates the effect of down sampling on the spectrum of a band-pass signal.
Figure 4:
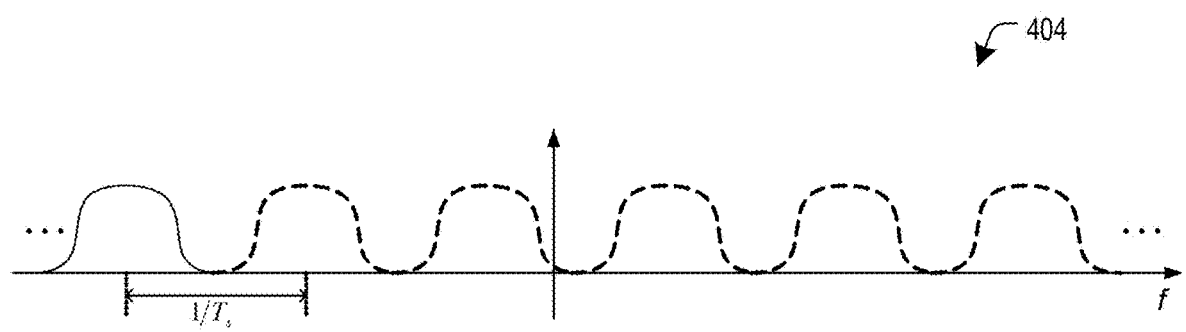
Figure 4:
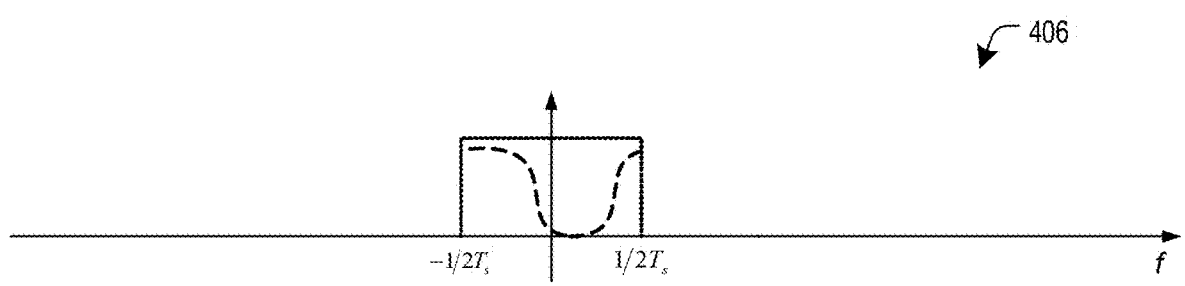

FIG. 4 illustrates the effect of down sampling on the spectrum of a band-pass signal, where the spectrum of a band-pass signal is illustrated at 402. The band-pass signal repeated in frequency $1/T_s$ is illustrated at 404. As illustrated at 406, the spectrum of the down sampled signal with a sampling rate $1/T_s$ can be a cyclically shifted version of the original spectrum depending on the spectrum occupied by the band-pass signal and the down sampling rate. The role of the cyclic subcarrier shift illustrated in FIG. 3 is to compensate for this effect, because the OFDM signal of ED #i in FIG. 3 is band-pass in general.

Although FIG. 4 illustrates one example of the effect of down sampling on the spectrum of a band-pass signal, various changes may be made to FIG. 4. For example, the spectrum of the band-pass signal and the sampling rate $1/T_s$ are for illustration only.

Figure 5:
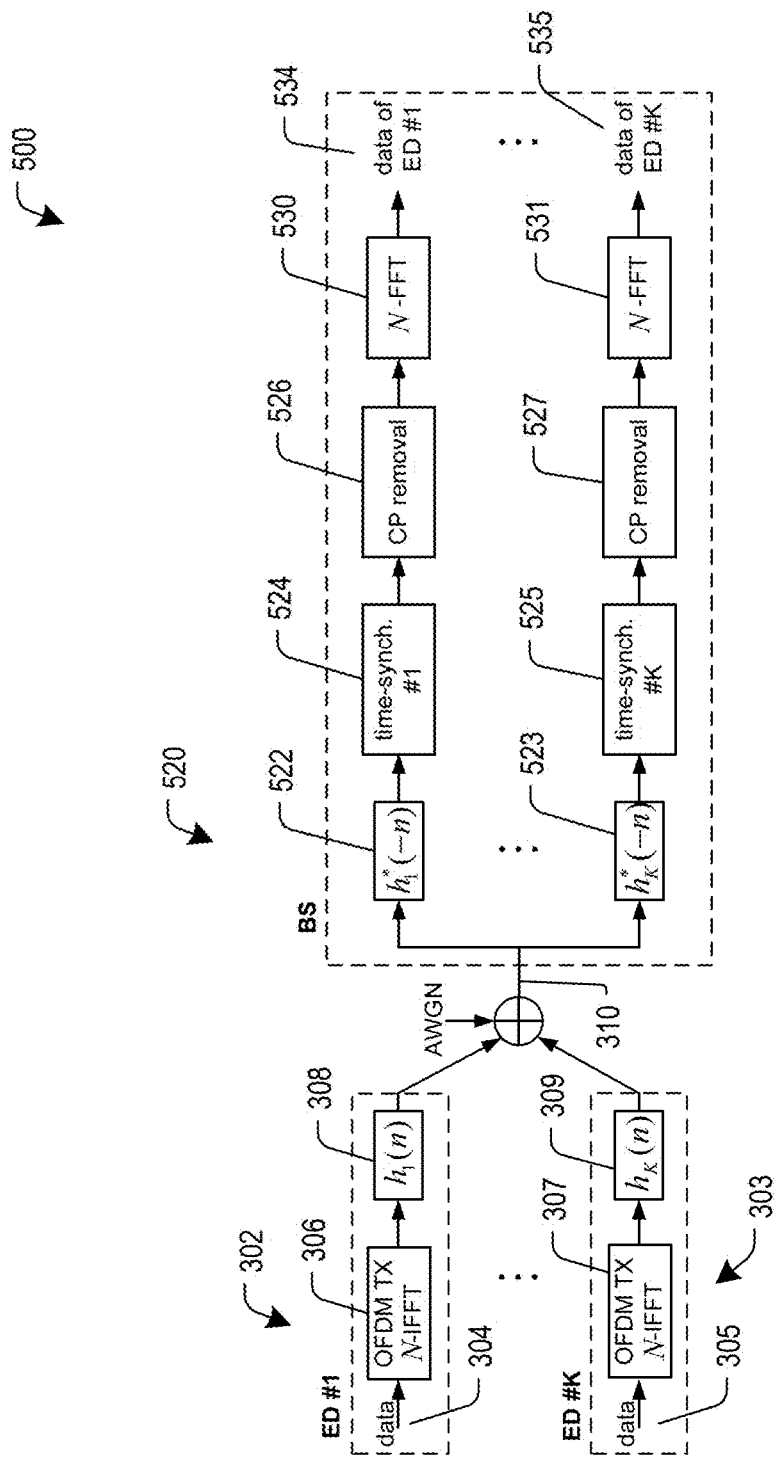
FIG. 5 illustrates an example of a topology or system for implementing asynchronous communication according to another embodiment.

FIG. 5 illustrates another example of a topology or system 500 for wireless transmission of data according to an embodiment of this disclosure. The system 500 comprises the plurality of electronic devices 302 to 303 (e.g., ED #1 to ED #K) of FIG. 3 and at least one receiver 520. The differences between this example and the example illustrated in FIG. 3 are that in this example, there is no down sampling, no short FFT, and no cyclic subcarrier shifting. Instead, a full-size FFT is performed per ED.

The modulated signals transmitted by the EDs 302, 303 are combined such that the receiver 520 receives the combined signal 310. As illustrated, the received signal 310 is passed through K chains of operations corresponding to the K EDs 302, 303. The output of each chain is the demodulated sequence of the corresponding ED (e.g., 534, 535).

To illustrate, the receiver operation of the i'th chain includes filtering, where the received signal 310 is passed through a filter $h_i^*(-n)$, which is matched to the corresponding filter used at ED #i. For example, the receiver operation of the first chain includes filtering, where the received signal 310 is passed through a filter $h_1^*(-n)$ 522, which is matched to the filter 308 used at ED #1 302. Similarly, the receiver operation of the K'th chain includes filtering, where the received signal 310 is passed through a filter $h_K^*(-n)$ 523, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED. To illustrate, the receiver operation of the first chain includes time synchronization that is performed at a time synchronization block 524. At the output of the filter 522, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)*h_1*(-n)$. The delay compensated signal is then divided into OFDM symbols, and the cyclic prefix (CP) is removed from each received OFDM symbol by the cyclic prefix removal block 526.

Similarly, the receiver operation of the K'th chain includes time synchronization that is performed at a time synchronization block 525. At the output of the filter 523, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)*h_K*(-n)$. The delay compensated signal is then divided into OFDM symbols, and the cyclic prefix (CP) is removed from each received OFDM symbol by the cyclic prefix removal block 527.

The receiver operation of the i'th chain includes a full-size FFT performed per ED at an FFT block to transform each symbol to the frequency domain. For example, the receiver operation of the first chain includes performing a full-size FFT at an FFT block 530 after the cyclic prefix is removed. Similarly, the receiver operation of the K'th chain includes performing a full-size FFT at an FFT block 531 after the cyclic prefix is removed. The output of each chain (e.g., 534, 535) is the demodulated sequence of the corresponding ED.

Although FIG. 5 illustrates one example of a system 500 for wireless transmission of data according to an embodiment of this disclosure, various changes may be made to FIG. 5. For example, various components in FIG. 5 could be combined, further sub-divided, moved, or omitted and additional components could be added according to particular needs. Also, the system 500 could include any number of each component shown in FIG. 5.

Figure 6:
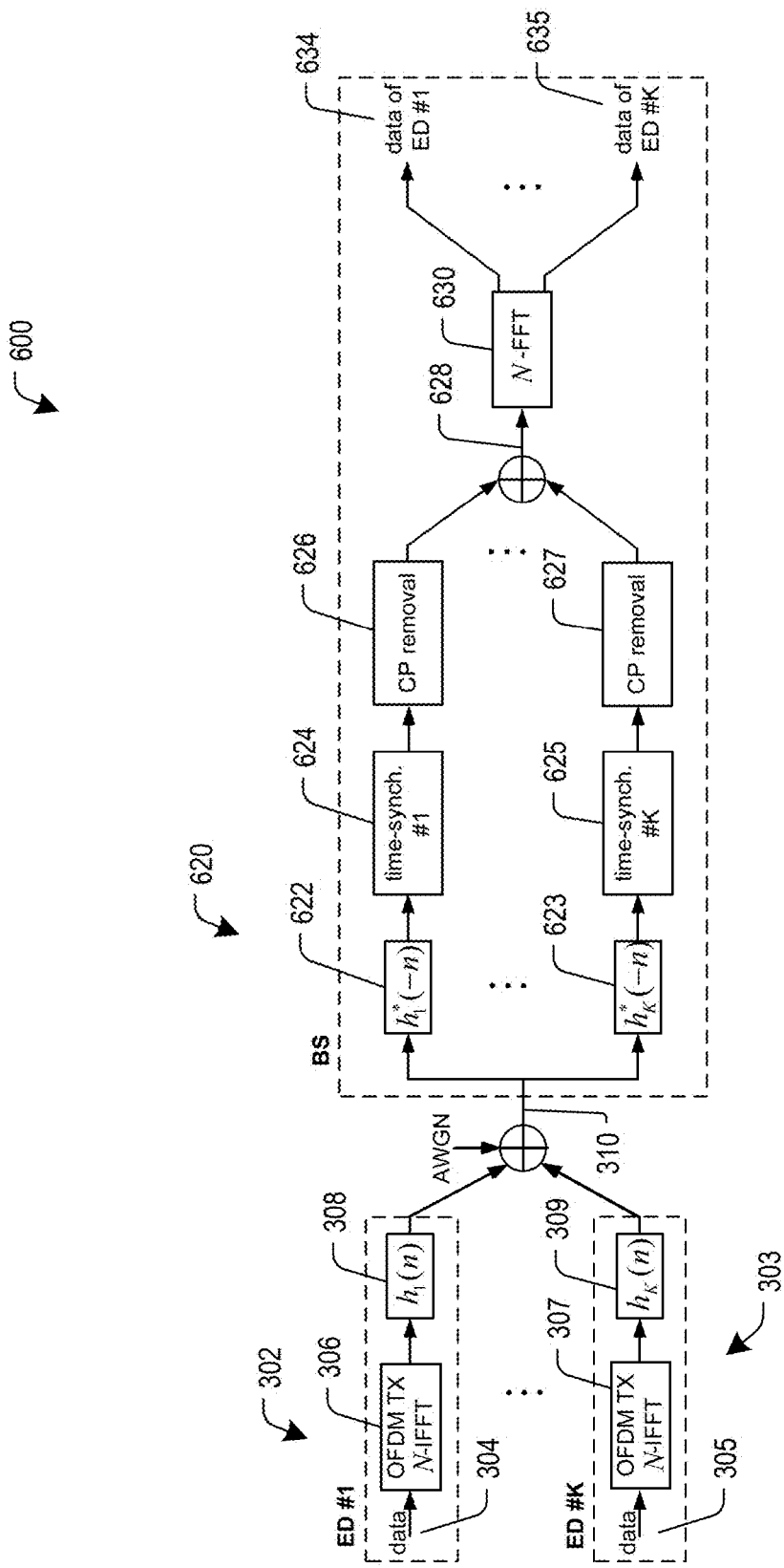
FIG. 6 illustrates an example of a topology or system for implementing asynchronous communication according to yet another embodiment.

FIG. 6 illustrates another example of a topology or system 600 for wireless transmission of data according to an embodiment of this disclosure. The system 600 comprises the plurality of electronic devices 302 to 303 (e.g., ED #1 to ED #K) of FIG. 3 and at least one receiver 620. The differences between this example and the example illustrated in FIG. 5 are that in this example, there is only a single full-size FFT performed at the receiver 620.

The modulated signals transmitted by the EDs 302, 303 are combined such that the receiver 620 receives the combined signal 310. As illustrated, the received signal 310 is passed through K chains of operations corresponding to the K EDs 302, 303. The output of each chain is the demodulated sequence of the corresponding ED (e.g., 634, 635).

To illustrate, the receiver operation of the i'th chain includes filtering, where the received signal 310 is passed through a filter $h_i*(-n)$, which is matched to the corresponding filter used at ED #i. For example, the receiver operation of the first chain includes filtering, where the received signal 310 is passed through a filter $h_1*(-n)$ 622, which is matched to the filter 308 used at ED #1 302. Similarly, the receiver operation of the K'th chain includes filtering, where the received signal 310 is passed through a filter $h_K*(-n)$ 623, which is matched to the filter 309 used at ED #K 303.

The receiver operation of the i'th chain includes per-ED time synchronization that is performed at a time synchronization block. For example, at the output of the filtering described above, the operational window is shifted appropriately to be time-synchronized to the corresponding ED. To illustrate, the receiver operation of the first chain includes time synchronization that is performed at a time synchronization block 624. At the output of the filter 622, a delay compensated signal is obtained by shifting the operational window appropriately to be time-synchronized to the corresponding ED (e.g., ED #1 302). The appropriate time shift includes the delay of ED #1 302 together with the aggregate delay of the end-to-end filter $g_1(n) \triangleq h_1(n)*h_1*(-n)$. The delay compensated signal is then divided into OFDM symbols, and the cyclic prefix (CP) is removed from each received OFDM symbol by the cyclic prefix removal block 626.

Similarly, the receiver operation of the K'th chain includes time synchronization that is performed at a time synchronization block 625. At the output of the filter 623, a delay compensated signal is obtained by shifting the operational window appropriately to be time-synchronized to the corresponding ED (e.g., ED #K 303). The appropriate time shift includes the delay of ED #K 303 together with the aggregate delay of the end-to-end filter $g_K(n) \triangleq h_K(n)*h_K*(-n)$. The delay compensated signal is then divided into OFDM symbols, and the cyclic prefix (CP) is removed from each received OFDM symbol by the cyclic prefix removal block 627. The outputs of the cyclic prefix removal blocks 626, 627 are summed to form a combined output 628.

The receiver operation includes a single full-size FFT performed at an FFT block to transform each symbol to the frequency domain. For example, the receiver operation of the first chain includes performing a single full-size FFT on the combined cyclic prefix removed symbol at an FFT block 630. Similarly, the receiver operation of the K'th chain includes performing the single full-size FFT on the combined cyclic prefix removed symbol at the FFT block 630. The output of each chain (e.g., 634, 635) is the demodulated sequence of the corresponding ED.

Although FIG. 6 illustrates one example of a system 600 for wireless transmission of data according to an embodiment of this disclosure, various changes may be made to FIG. 6. For example, various components in FIG. 6 could be combined, further sub-divided, moved, or omitted and additional components could be added according to particular needs. Also, the system 600 could include any number of each component shown in FIG. 6.

Figure 7:
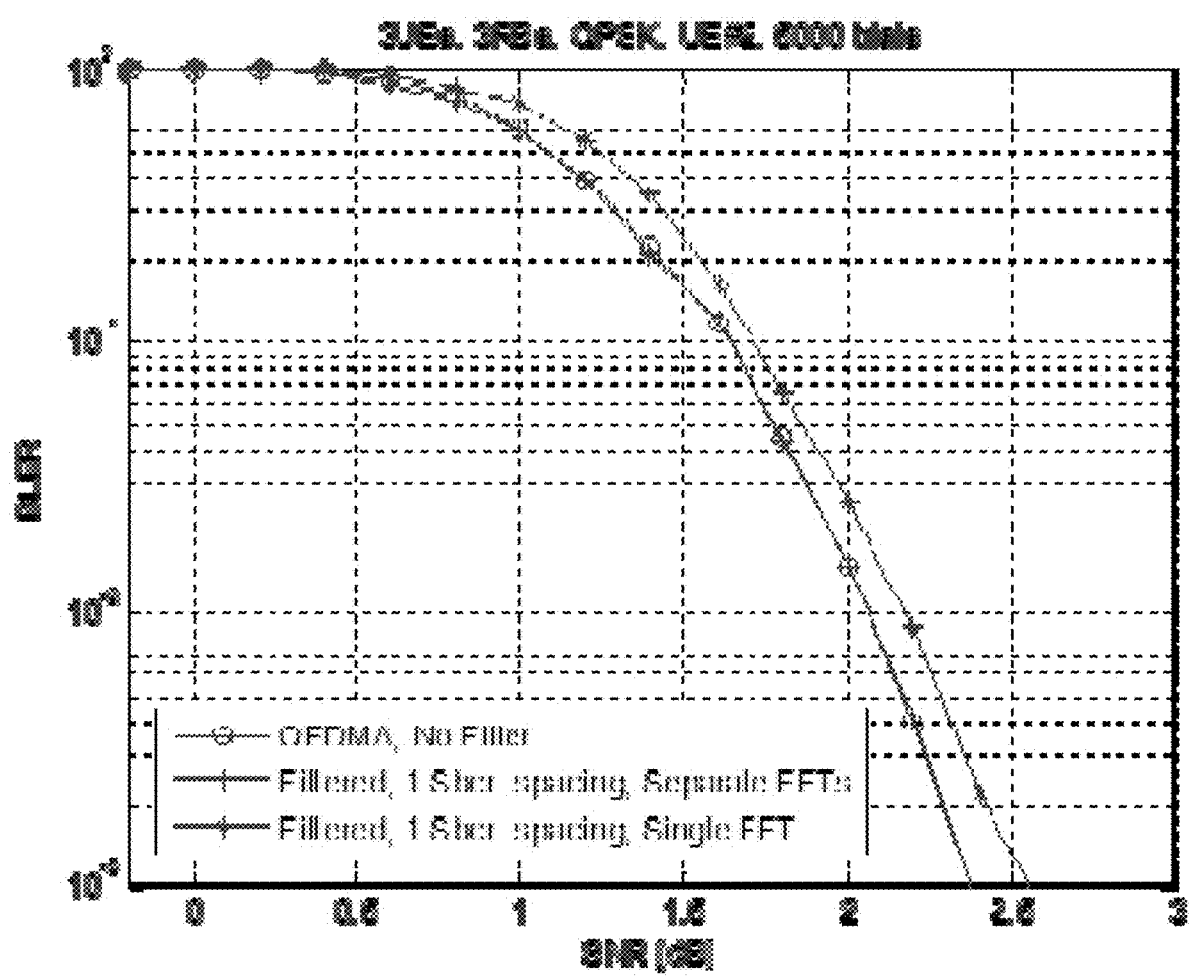
FIGS. 7-9 illustrate BLER curves for various modulations compared with synchronous OFDMA.
Figure 8:
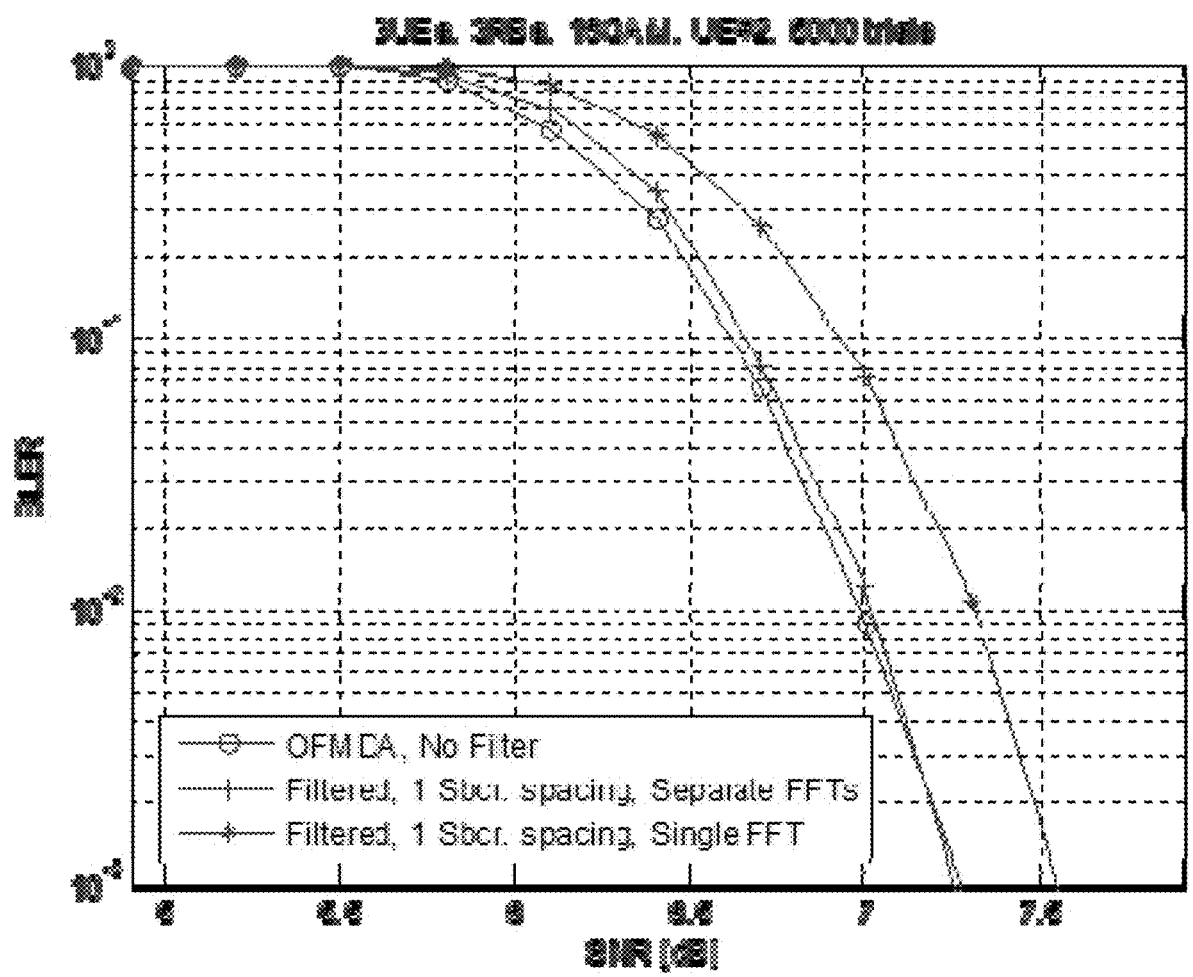
Figure 9:
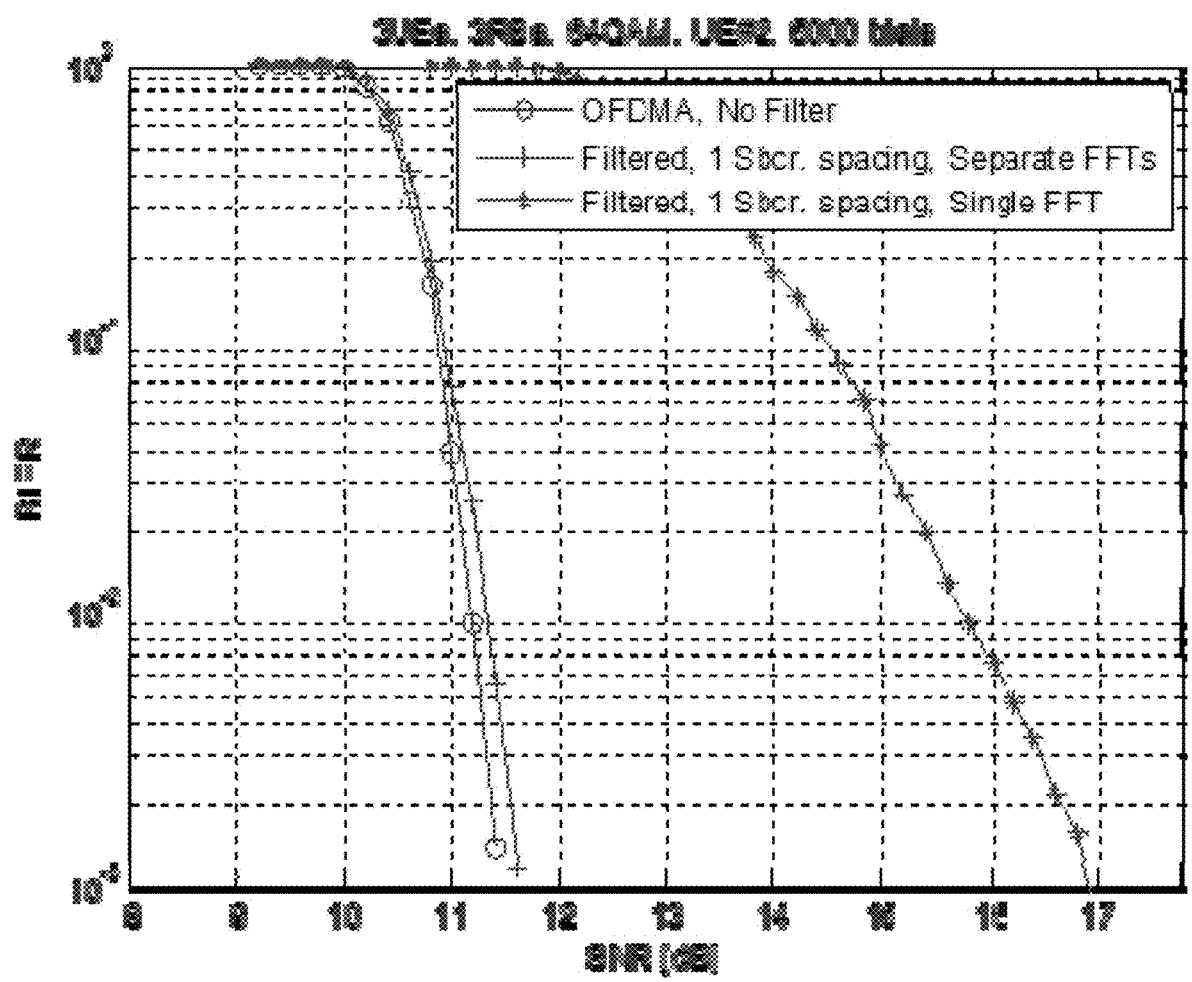

FIGS. 7-9 illustrate Block Error Rate (BLER) curves for various modulations using the proposed asynchronous OFDMA/SC-FDMA system compared with using synchronous OFDMA. FIG. 7 illustrates the BLER performance of the proposed asynchronous OFDMA/SC-FDMA system with Quadrature Phase Shift Keying (QPSK) and Forward Error Correction (FEC) rate ½ over an Additive White Gaussian Noise (AWGN) channel. As illustrated in FIG. 7, the asynchronous OFDMA shows substantially the same BLER performance as synchronous OFDMA for QPSK.

FIG. 8 illustrates the BLER performance of the proposed asynchronous OFDMA/SC-FDMA system with 16 QAM and FEC rate ½ over an AWGN channel. As illustrated, the performance loss is less than 0.05 dB for 16 QAM.

FIG. 9 illustrates the BLER performance of the proposed asynchronous OFDMA/SC-FDMA system with 64 QAM and FEC rate ½ over an AWGN channel. As illustrated in FIG. 9, the performance loss is less than 0.2 dB for 64 QAM.

In arriving at the results illustrated in FIGS. 7-9, an uplink asynchronous OFDMA system was simulated using the proposed scheme in the scenario where three EDs communicate with the receiver. Three resource blocks were assigned to each ED and one guard subcarrier was reserved between each pair of EDs that are adjacent in frequency. An FIR filter was used with time duration T/2, where T is the OFDM symbol duration without CP. The ED FFT size was N=1024 and the receiver FFT sizes were $N_i$=64, $1 \le i \le 3$. The transmission bandwidth was 10 MHz and the signals were passed through an Additive White Gaussian Noise (AWGN) channel with random delays uniformly distributed between 0 and T.

For the sake of comparison, a modified receiver is also simulated wherein the outputs of the per-ED time synchronization blocks are added together and passed through a single OFDM demodulator with FFT size 1024 (as illustrated in FIG. 6). The simulation result for each modulation level is also shown in FIGS. 7-9 as "Filtered, 1 Sbcr Spacing, Single FFT". As illustrated, this receiver has a performance gap which is more significant for higher modulation levels. The performance loss is due to the residual inter-ED interference which remains in the demodulated signal after the single FFT operation. This illustrates the benefit of separate ED processing in the proposed asynchronous OFDMA/SC-FDMA decoder as opposed to single FFT operation.

Figure 10:
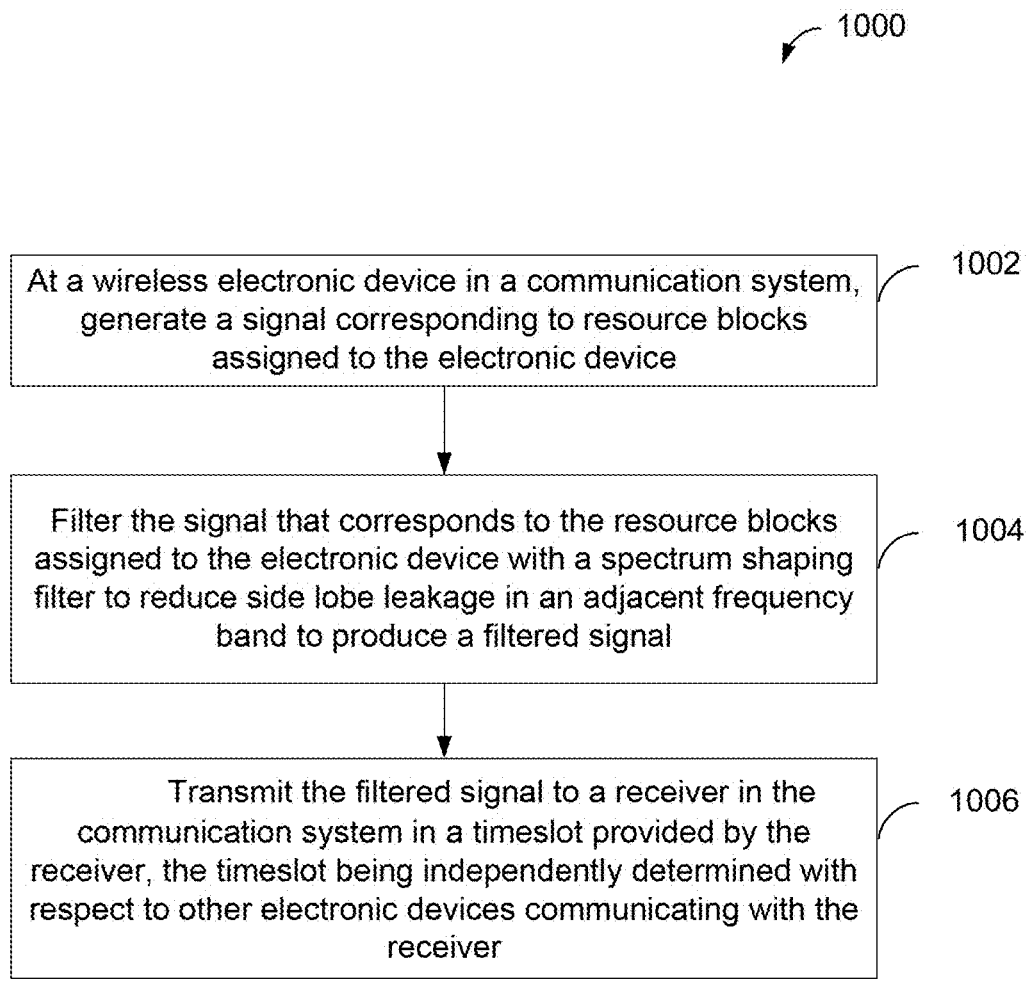
FIG. 10 illustrates a flow diagram illustrating a method of operating an electronic device according to one embodiment.

FIG. 10 is a flow diagram illustrating a method 1000 of operating an electronic device in accordance with disclosed embodiments that may be performed, for example, by an electronic device such as the electronic device 110 of FIG. 1 or the electronic devices 302, 303 of FIGS. 3, 5 and 6.

The method 1000 includes generating a signal corresponding to resource blocks assigned to the wireless device, at step 1002. For example, each ED 302, 303 generates its modulated signal (which is the result of an IFFT operation on the modulation data sequence) corresponding to its assigned resource blocks.

The method 1000 includes filtering the signal that corresponds to the resource blocks assigned to the wireless device with a spectrum shaping filter and producing a filtered signal that eliminates side lobe leakage to a second wireless device adjacent to the wireless device in frequency, at step 1004. For example, each ED 302, 303 passes its OFDM signal through its appropriately designed spectrum shaping filter 308, 309 in order to eliminate side lobe leakage to the adjacent electronic devices in frequency.

The method 1000 includes transmitting the filtered signal to a receiver in the wireless communication system in a timeslot provided by a scheduler coupled to the receiver, the timeslot being independently determined with respect to other electronic devices communicating with the receiver, at step 1006. In one embodiment, the filtered signal is transmitted with a synchronization reference. The synchronization reference is, in one example, a known pattern that allows a transmitter and receiver to synchronize themselves. In another example, synchronization information from a third party source can be used to synchronize the ED with the receiver. For example, the modulated signal transmitted by the ED 302 of FIG. 3 is transmitted to the receiver 320 in a timeslot provided by the scheduler 253. The timeslot provided to the ED 302 is independently determined with respect to other electronic devices (e.g., the ED 303) communicating with the receiver 320. Similarly, the modulated signal transmitted by the ED 303 of FIG. 3 is transmitted to the receiver 320 in a timeslot provided by the scheduler 253. The timeslot provided to the ED 303 is independently determined with respect to other electronic devices (e.g., the ED 302) communicating with the receiver 320. Because the filtered signal transmitted by each of the EDs 302, 303 is transmitted to the receiver 320 in a timeslot provided by the scheduler 253 that is independently determined with respect to other electronic devices communicating with the receiver, and because the filtered signal transmitted by each of the EDs 302, 303 reduces or eliminates side lobe leakage in an adjacent frequency band, overhead with respect to timing advance signaling may be reduced.

Although FIG. 10 illustrates one example of a method 1100 of operating an electronic device in accordance with disclosed embodiments, various changes may be made to FIG. 10. For example, while shown as a series of steps, various steps in FIG. 10 could overlap, occur in parallel, occur in a different order, or occur any number of times.

Figure 11:
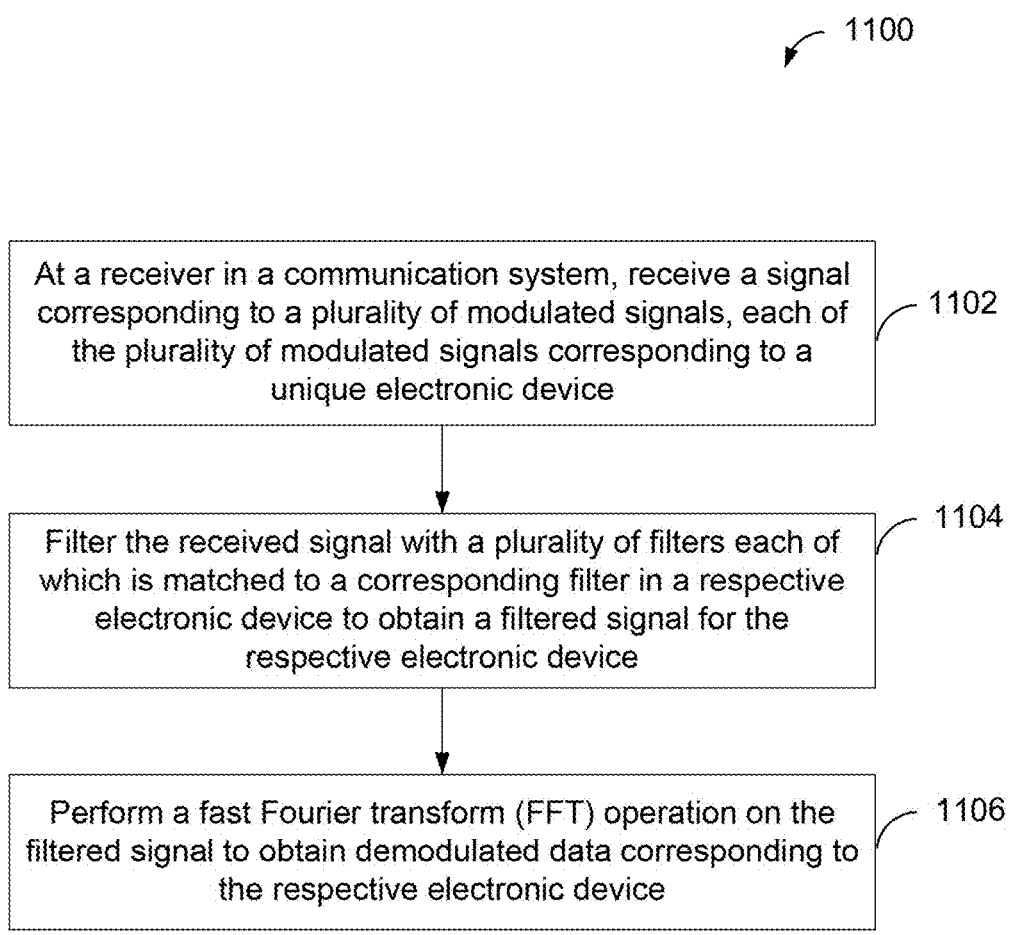
FIG. 11 illustrates a flow diagram illustrating a method of operating a receiver according to one embodiment.

FIG. 11 is a flow diagram illustrating a method 1100 of operating a receiver in accordance with disclosed embodiments that may be performed, for example, by a base station such as the base station 170 of FIG. 1 or the receiver 620 of FIG. 6.

The method 1100 includes receiving a signal corresponding to a plurality of modulated signals, each of the plurality of modulated signals corresponding to a unique electronic device, at step 1102. For example, the received signal 310, which corresponds to the modulated signals transmitted by each of the EDs 302, 303 is received at the receiver 320.

The method 1100 includes filtering the received signal with a filter that is matched to a corresponding filter in a respective electronic device to obtain a filtered signal for the respective electronic device, at step 1104. For example, the receiver operation of the first chain includes filtering the received signal 310 with the filter $h_1^*(-n)$ 322, which is matched to the filter 308 used at ED #1 302.

The method 1100 includes performing a fast Fourier transform (FFT) operation on the filtered signal to obtain demodulated data corresponding to the respective electronic device, at step 1106. For example, as illustrated in FIG. 3, the receiver operation of the i'th chain includes scaling to account for the down sampling effect and the scaled signal is passed through an $N_i$-point FFT block (e.g., a "short" FFT) to transform each symbol to the frequency domain. As another example, as illustrated in FIG. 5, the receiver operation of the first chain includes performing a full-size FFT at the FFT block 530 after the cyclic prefix is removed. As yet another example, as illustrated in FIG. 6, the receiver operation of the first chain includes performing a single full-size FFT on the combined time synchronization output with the cyclic prefix removed at the FFT block 630.

Although FIG. 11 illustrates one example of a method 1100 of operating a receiver in accordance with disclosed embodiments, various changes may be made to FIG. 11. For example, while shown as a series of steps, various steps in FIG. 11 could overlap, occur in parallel, occur in a different order, or occur any number of times.

Figure 12:
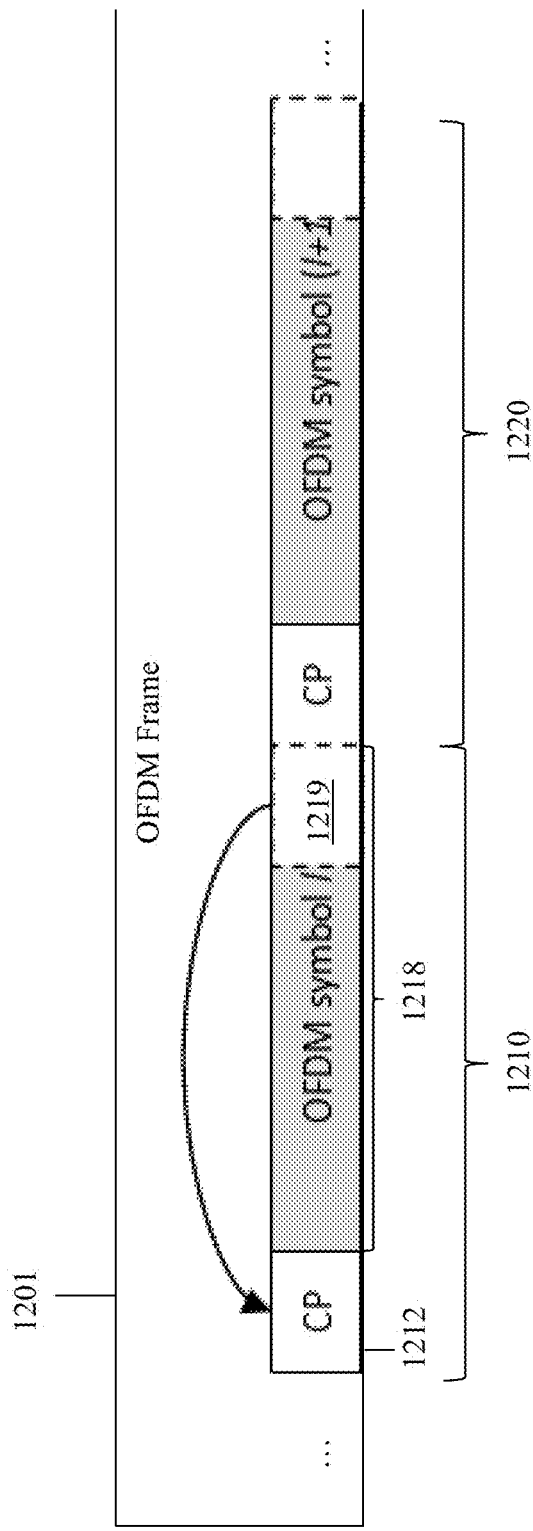
FIG. 12 illustrates a diagram of an OFDM frame carrying OFDM symbols.

FIG. 12 illustrates a diagram of an OFDM frame 1201 comprising a plurality of OFDM symbols. As shown, the OFDM frame 1201 includes an OFDM symbol 1210 and an OFDM symbol 1220. The OFDM symbol 1210 includes a cyclic prefix 1212 that comprises a repetition of an ending portion 1219 of a data portion 1218 of the OFDM symbol 1210. The cyclic prefix 1212 may help mitigate inter-symbol-interference between the OFDM symbol 1210 and the OFDM symbol 1220.

Additionally, the cyclic prefix 1212 may reduce the complexity of equalization at the receiver such that the complexity of linear convolution is similar (or equivalent) to the complexity of circular convolution.

In some embodiments, the OFDM frame 1201 may be filtered using a digital filter whose filter length exceeds the length of the cyclic prefix 1212. Conventional wisdom is that the filter length should be less than the length of a cyclic prefix to avoid inter-symbol-interference (ISI). However, in embodiments of this disclosure, the side-lobes of the filter signal may roll of quickly, and therefore the ISI may not be significant when the filter length exceeds the length of the cyclic prefix 1212. The duration of the filtered CP-OFDM signal may be expressed by the following equation: M=N+L−1, where M is the duration of the filtered CP-OFDM signal, N is a duration of the CP-OFDM signal, and L is the filter length of the digital filter. Digitally filtering the CP-OFDM signal may include convolving a filter kernel (or filtering signal) with the CP-OFDM signal. The digital filter may include a finite impulse response (FIR) filter or an infinite impulse response (IIR) filter. In some embodiments, different digital filters may be applied to each sub-band of the CP-OFDM signal. Each sub-band may be assigned to a group of one or more user equipments (UEs). The digital filter applied to a specific sub-band of the CP-OFDM signal may be used by the corresponding UE during signal decoding. The bandwidth of the digital filter may be adjusted based on the bandwidth of the CP-OFDM signal.

Figure 13:
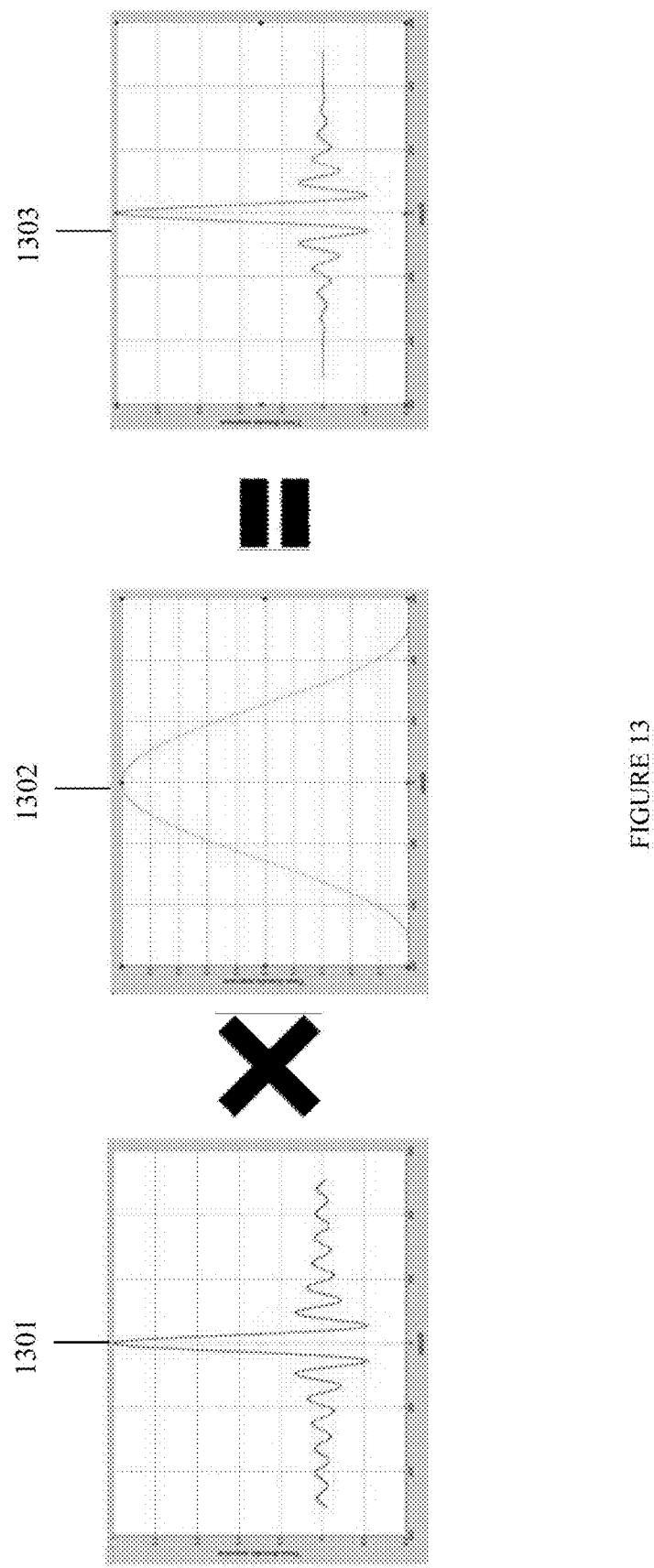
FIG. 13 illustrates graphs of a filtering signal and signals used to obtain the filtering signal.

FIG. 13 illustrates graphs of a band-pass filter 1301, a time domain window 1302, and a filtering signal 1303. The filtering signal 1303 may also be referred to as a time domain filter kernel, and may be obtained by combining the band-pass filter 1301 with the time domain window 1302. As shown, the band-pass filter 1301 appears substantially similar to a Sinc function (e.g., a Sinc pulse kernel) in the time domain. Because a Sinc function has an infinite length, the time domain window 1302 is applied to the band-pass filter 1301 to produce the filtering signal 1301 having a finite length. To mitigate inter-symbol-interference, the time domain window 1302 rolls off from the center to reduce the energy spread during application of the filtering signal 1303. Moreover, the time domain window 1302 has a relatively low stop-band floor in the frequency domain, as well as a relatively short transition band in the frequency domain, to reduce inter-band-interference.

Figure 14:
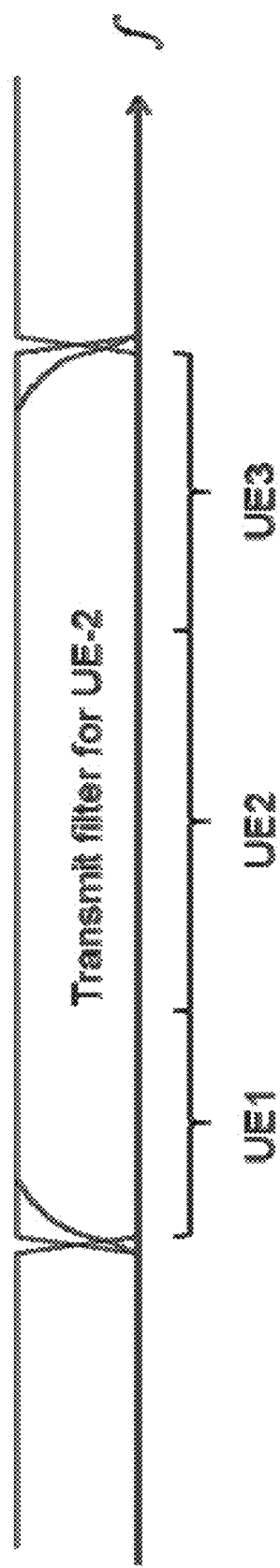
FIG. 14 illustrates a diagram of an embodiment fast-OFDM (f-OFDM) channel.

The following function is an example of a time-domain window:

$$W(n) = \left[0.5\left(1 - \cos\frac{2\pi n}{N-1}\right)\right]^\alpha,$$

where n is a sample in the time domain, N is the length of the time-domain window, and α is a window shaping parameter. Notably, the function produces a Hanning window when α=1, and a root-raised-cosine (RRC) window when α=0.5. The value of α may typically range from 0.5 to 1.0. Other windows (e.g., a Kaiser window) can also be used. Aspects of this disclosure apply a time-domain window (e.g., Hanning, RRC, Kaiser, etc.) in fast-OFDM (f-OFDM) in a manner that does not produce excessive ISI. Notably, the length of digital filters used in f-OFDM may be different for different users. FIG. 14 illustrates a diagram of an f-OFDM channel carrying data transmitted a first UE (UE1), a second UE (UE2), and a third UE (UE3). Notably, UE2 is further away from the edges of the band than UE1 and UE3, and can therefore use a longer transition band than UE1 and UE3 so long as filtering performed by UE2 does not cause interference to the neighboring bands. A receiver (e.g., an eNB receiving uplink transmissions from the UEs) may apply the same length filter for all three UEs. For instance, the receiver may apply a filter having a length equal to the filters used by UE1 and UE2 when receiving signals from each of the UEs, and consequently the receiver apply a shorter filter upon receiving a signal than UE2 used when transmitting the signal. In one embodiment, a UE scheduled away from the band edges may not use a filter at all. This will make f-OFDM backwards compatible with UEs not aware of f-OFDM. The same principals can be applied to downlink signals. For instance, a scheduled away from the band-edge can use a longer filter, or no filter, so long as it is able to remove or mitigate interference from neighboring bands.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method for communicating orthogonal frequency-division multiplexing (OFDM) signals in a wireless communication system, the method comprising:
    obtaining, by a first user equipment (UE), a cyclic prefix based orthogonal frequency-division multiplexed (CP-OFDM) signal comprising a plurality of CP-OFDM symbols having a cyclic prefix comprising a repetition of an end of a corresponding CP-OFDM symbol;
    applying a digital filter to the CP-OFDM signal to obtain a filtered CP-OFDM signal, wherein main lobes of the filtered CP-OFDM signal have bandwidths in the frequency domain that are equal to bandwidths associated with a plurality of resource blocks (RBs); and
    transmitting, to a base station, the filtered CP-OFDM signal over the plurality of RBs, wherein the filtered CP-OFDM signal is decoded by the base station based on a first per-UE based time synchronization corresponding to the first UE, wherein a second filtered CP-OFDM signal from a second UE is decoded by the base station based on a second per-UE based time synchronization corresponding to the second UE, the second per-UE based time synchronization being different from the first per-UE based time synchronization, and wherein the filtered CP-OFDM signal and the second filtered CP-OFDM signal are received as a combined signal by the base station.

2. The method of claim 1, wherein a duration of the filtered CP-OFDM signal is expressed by the following equation: M=N+L−1, where M is the duration of the filtered CP-OFDM signal, N is a duration of the CP-OFDM signal, and L is a filter length of the digital filter.

3. The method of claim 1, wherein applying the digital filter to the CP-OFDM signal comprises:
generating a filtering signal; and
convolving the filtering signal with the CP-OFDM signal to obtain the filtered CP-OFDM signal.

4. The method of claim 1, wherein applying the digital filter to the CP-OFDM signal comprises:
applying, by the base station, a different digital filter to each sub-band of the CP-OFDM signal, wherein each sub-band is assigned to a group of one or more UEs.

5. The method of claim 1, wherein applying the digital filter to the CP-OFDM signal comprises:
applying, by the first UE, the digital filter to a specific sub-band carrying the CP-OFDM signal, the specific sub-band being assigned to the first UE.

6. The method of claim 1, wherein a bandwidth of the digital filter is variable.

7. The method of claim 6, further comprising adjusting the bandwidth of the digital filter in accordance with a bandwidth of the CP-OFDM signal.

8. The method of claim 6, wherein a radio interface extends between the base station and the first UE, and wherein the CP-OFDM signal is transmitted by the base station.

9. The method of claim 7, wherein the CP-OFDM signal is transmitted over a specific frequency sub-band.

10. The method of claim 1, wherein the transmitting comprises:
transmitting the filtered CP-OFDM signal without time synchronization with respect to the second UE served by the base station.

11. A first UE, comprising:
a processor; and
a computer readable storage medium storing programming comprising instructions for execution by the processor, that when executed cause the first UE to:
obtain a cyclic prefix based orthogonal frequency-division multiplexed (CP-OFDM) signal comprising a plurality of CP-OFDM symbols having a cyclic prefix comprising a repetition of an end of a corresponding CP-OFDM symbol;
apply a digital filter to the CP-OFDM signal to obtain a filtered CP-OFDM signal, wherein main lobes of the filtered CP-OFDM signal have bandwidths in the frequency domain that are equal to bandwidths associated with a plurality of resource blocks (RBs); and
transmit, to a base station, the filtered CP-OFDM signal over the plurality of RBs, wherein the filtered CP-OFDM signal is decoded by the base station based on a first per-UE based time synchronization corresponding to the first UE, wherein a second filtered CP-OFDM signal from a second UE is decoded by the base station based on a second per-UE based time synchronization corresponding to the second UE, the second per-UE based time synchronization being different from the first per-UE based time synchronization, and wherein the filtered CP-OFDM signal and the second filtered CP-OFDM signal are received as a combined signal by the base station.

12. The first UE of claim 11, wherein a duration of the filtered CP-OFDM signal is expressed by the following equation: $M=N+L-1$, where M is the duration of the filtered CP-OFDM signal, N is a duration of the CP-OFDM signal, and L is a filter length of the digital filter.

13. The first UE of claim 11, wherein the instructions to apply the digital filter to the CP-OFDM signal include instructions to:
generate a filtering signal; and
convolve the filtering signal with the CP-OFDM signal to obtain the filtered CP-OFDM signal.

14. The first UE of claim 11, wherein the programming further includes instructions to adjust a bandwidth of the digital filter in accordance with a bandwidth of the CP-OFDM signal.

15. The first UE of claim 11, wherein a radio interface extends between the base station and the first UE, and wherein the CP-OFDM signal is transmitted by the base station.

16. A method for receiving orthogonal frequency-division multiplexing (OFDM) signals in a wireless communication system, the method comprising:
receiving, by a base station from a first user equipment (UE), a cyclic prefix based orthogonal frequency-division multiplexed (CP-OFDM) signal over a plurality of resource blocks (RBs), the CP-OFDM signal comprising a plurality of CP-OFDM symbols having a cyclic prefix comprising a repetition of an end of a corresponding CP-OFDM symbol;
receiving, by the base station from a second UE, a second CP-OFDM signal, wherein the CP-OFDM signal and the second CP-OFDM signal are received as a combined signal;
applying a digital filter to the CP-OFDM signal to obtain a filtered CP-OFDM signal, wherein main lobes of the filtered CP-OFDM signal have bandwidths in the frequency domain that are equal to bandwidths associated with the plurality of RBs;
applying a second digital filter to the second CP-OFDM signal to obtain a second filtered CP-OFDM signal;
performing a first per-UE based time synchronization of the filtered CP-OFDM signal, the first per-UE based time synchronization corresponding to the first UE;
performing a second per-UE based time synchronization of the second filtered CP-OFDM signal, the second per-UE based time synchronization corresponding to the second UE, the second per-UE based time synchronization being different from the first per-UE based time synchronization; and
processing the filtered CP-OFDM signal and the second filtered CP-OFDM signal.

17. The method of claim 16, wherein a duration of the filtered CP-OFDM signal is expressed by the following equation: $M=N+L-1$, where M is the duration of the filtered CP-OFDM signal, N is a duration of the CP-OFDM signal, and L is a filter length of the digital filter.

18. The method of claim 16, wherein applying the digital filter to the CP-OFDM signal comprises:
applying, by the base station, the digital filter to a specific sub-band of the CP-OFDM signal, the specific sub-band being assigned to the first UE.

19. The method of claim 16, wherein applying the digital filter to the CP-OFDM signal comprises:
applying, by the base station, a different digital filter to each sub-band of the CP-OFDM signal, wherein each sub-band is assigned to a group of one or more UEs.

20. The method of claim 16,
wherein the filtered CP-OFDM signal and the second CP-OFDM signal are received as the combined signal of an asynchronous superposition of the filtered CP-OFDM signal and the second CP-OFDM signal.

21. The method of claim 16, further comprising:

down-sampling the filtered CP-OFDM signal to obtain a down-sampled CP-OFDM signal; and scaling the down-sampled CP-OFDM signal to obtain a scaled CP-OFDM signal to account for an effect of the down-sampling.

22. An apparatus, comprising:

a processor; and a computer readable storage medium storing programming for execution by the processor, that when executed cause the apparatus to perform operations, the operations comprising:

receiving, from a first user equipment (UE), a cyclic prefix based orthogonal frequency-division multiplexed (CP-OFDM) signal over a plurality of resource blocks (RBs), the CP-OFDM signal comprising a plurality of CP-OFDM symbols having a cyclic prefix comprising a repetition of an end of a corresponding CP-OFDM symbol;

receiving, from a second UE, a second CP-OFDM signal, wherein the CP-OFDM signal and the second CP-OFDM signal are received as a combined signal;

applying a digital filter to the CP-OFDM signal to obtain a filtered CP-OFDM signal, wherein main lobes of the filtered CP-OFDM signal have bandwidths in the frequency domain that are equal to bandwidths associated with the plurality of RBs;

applying a second digital filter to the second CP-OFDM signal to obtain a second filtered CP-OFDM signal;

performing a first per-UE based time synchronization of the filtered CP-OFDM signal, the first per-UE based time synchronization corresponding to the first UE;

performing a second per-UE based time synchronization of the second filtered CP-OFDM signal, the second per-UE based time synchronization corresponding to the second UE, the second per-UE based time synchronization being different from the first per-UE based time synchronization; and processing the filtered CP-OFDM signal.

23. The apparatus of claim 22, the operations further comprising:

down-sampling the filtered CP-OFDM signal to obtain a down-sampled CP-OFDM signal; and scaling the down-sampled CP-OFDM signal to obtain a scaled CP-OFDM signal to account for an effect of the down-sampling.

* * * * *